Aug. 28, 1928.

R. YOUNG

ATTACHMENT FOR SPECTACLES

Filed Jan. 22, 1927

1,681,964

INVENTOR
Robert Young
BY
*Frederick Breitenfeld*
his ATTORNEY

Patented Aug. 28, 1928.

1,681,964

UNITED STATES PATENT OFFICE.

ROBERT YOUNG, OF NEW YORK, N. Y.

ATTACHMENT FOR SPECTACLES.

Application filed January 22, 1927. Serial No. 162,716.

My present invention relates generally to attachments for spectacle frames, and has particular reference to a removable attachment designed for the primary purpose of supporting an instrumentality such as a head lamp or the like.

Although I shall hereinafter illustrate and describe my invention as applied to the purpose of supporting a head lamp, nevertheless it will be understood that as to certain phases of my invention an application of this character is not essential.

It is one of the important objects of the invention to provide a device which is so designed as to be removably attachable to a spectacle frame of usual construction, the device being so constructed and arranged that a head lamp or similar instrument may be supported thereby in a manner which will position the lamp substantially over the bridge portion of the spectacle frame and hence directly between the eyes of a wearer of the frame. In the employment of head lamps by surgeons, dentists, mechanics, and the like, the desirability of having the lamp project outwardly from a point midway between the eyes of a wearer or user will be obvious.

One feature of my invention lies in providing a device which may be independently manufactured and sold, so that the ultimate user thereof for the purpose of supporting a head lamp or the like may employ the device in a removable manner with any ordinary and independent spectacle frame.

It is essential that a supporting device of the character contemplated be so arranged and constructed as to assure the firm positioning of the lamp in its desired place. It is an object of my invention to provide a removable device having features of construction and arrangement which render its association with a spectacle frame peculiarly secure and reliable.

It is another object of the invention to provide a device which is so constructed and arranged that its attachability is solely dependent upon resilience; and more particularly, my invention contemplates the provision of portions in the nature of spring clamps whose inherent resilience is such as to render the resilient clamping and unclamping of the device from a spectacle frame extremely easy and at the same time positive and secure.

A particular feature of my invention lies in so arranging and constructing my device that the ultimate positioning of the head lamp carried thereby (where a head lamp is employed) will be always the same. To achieve this purpose, I make use of the predetermined divergence of the upwardly and downwardly extending frame portions adjacent to the bridge of the frame.

In one form of my invention, the supporting device may be constructed of an integral blank of resilient material such as metal, the blank being so configured and shaped as to provide the essential supporting and attaching portions contemplated by my invention.

Briefly, my invention contemplates the provision of a medial body portion adapted to overlie the bridge of the spectacle frame, and two pairs of clamping arms or portions associated therewith and adapted to cooperate with both eye rims of the frame.

Other features of my invention lie in the particular arrangement and construction of the clamping arms referred to, the arrangement being such as to render the device extremely efficient yet simple of construction and operation.

For the attainment of the foregoing objects and such other objects as may hereinafter appear or be pointed out, I have illustrated two forms of my invention in the accompanying drawings in which—

Figure 1:
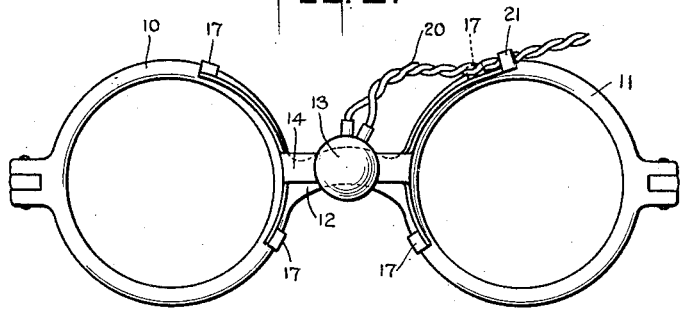
Fig. 1 is a front elevational view of a supporting device constructed in accordance with my invention and associated with a typical spectacle frame.

Referring to the drawings and particularly to Fig. 1, it will be observed that I have shown a spectacle frame having two circular eye rims 10 and 11 and an intermediate bridge portion 12 adapted to overlie the bridge of a wearer's nose. In the form shown, the removable attachment is designed to support a head lamp 13 in a position extending forwardly from a point intermediate the eyes of the wearer.

Figure 2:
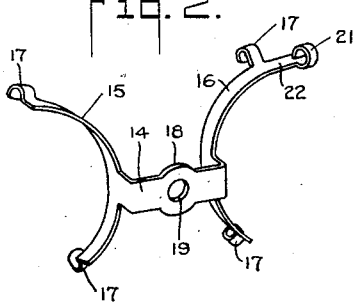
Fig. 2 is a perspective view of the supporting device of Fig. 1, the device being shown by itself.

In Fig. 2 I have illustrated the supporting device by itself, and it will be observed that I have provided a medial body portion 14 adapted to substantially overlie the bridge 12 of the frame, and associated at its opposite ends with clamping arms 15 and 16 whose arrangement and functioning will be presently described. The device may advantageously be constructed of a single blank of resilient material, the blank being initially stamped or cut into the form of the letter H. The blank is then shaped so as to cause the cross bar thereof to constitute the outstanding body portion 14. More particularly, it will be observed that the cross bar is bent backwardly adjacent to the ends thereof, thereby positioning the uprights of the H in juxtaposed parallel planes at right angles to the plane of the cross bar.

Where the device is constructed in this integral manner, the uprights are then shaped into the arcuate form shown in Fig. 2. In accordance with the present invention, the arcs into which the uprights are shaped conform substantially to those portions of the rims 10 and 11 adjacent to the bridge 12. The radius of each of the arcs is, however, not identical with the radius of each of the rims 10 and 11, it being contemplated that the forcing of the arms 15 and 16 into substantial conformity with the rims 10 and 11 will cause mutual resilient engagement between the arms and the rims.

In the embodiment shown, the arms 15 and 16 are so configured as to embody radii which are slightly smaller than the radii of the rims 10 and 11, and the arms may therefore be made to brace themselves as shown in Fig. 1 between the corresponding opposite portions of the rims 10 and 11.

At the extremities of the arms 15 and 16, I provide bracing portions adapted to engage the rims 10 and 11. I have shown these bracing portions constituted of integral tabs 17, substantially U-shaped, and having their concave sides inwardly positioned with respect to the arcs.

It will be noted that the arms 15 and 16 may be described as constituting two pairs of resilient clamping arms, one pair extending upwardly in a divergent manner from opposite ends of the medial body portion 14, and the other pair extending downwardly in a divergent manner from the corresponding ends of the body portion 14. The downwardly diverging arms or clamps are preferably smaller in length than the upwardly diverging clamps, the latter being of such a size as to position the bracing portion 17 at substantially 90° intervals.

The overall length of each arm 15 or 16 may be varied to suit requirements, but the arrangement wherein the bracing portions 17 are at substantially 90° intervals is particularly efficient because of the secure foothold achieved thereby. In other words, if the arms 15 or 16 were of a considerably shorter length, the forces acting upon the bracing portions 17 would approach horizontal parallelism, and the vertical components of these forces would be considerably reduced; accordingly, the security of the device against vertical shiftings would be impaired. On the other hand, if the arms 15 or 16 were of considerably greater length, the same disadvantages would present themselves with respect to horizontal shifting. Although I do not mean to limit myself to any particular length of clamping arm, nevertheless I have pointed out these details of support in order to more clearly explain the peculiarly efficient nature of my invention.

The medial body portion 14 may advantageously be provided with a central portion 18 of enlarged width provided with an opening 19, whereby the pivotal support for the head lamp 13 may be expeditiously mounted. The medial portion 14 is also provided in the outstanding manner shown for the reason that a space is thereby provided between the bridge 12 and the body portion 14 for the accommodation of attaching elements such as washers, nuts, etc., and also for the accommodation of washers or the like serving as terminals for electrical conducting wires 20. The latter may advantageously be threaded through a loop 21 provided in a slight extension 22 of the upper portion of the arm 16, the loop 21 being integrally formed similarly to the bracing portions 17.

Where the arms 15 and 16 are of reduced radii as in the illustrated form, the device may be easily attached to the spectacle frame by first engaging any three of the bracing portions 17 with the frame, and then forcing the fourth bracing portion to assume its proper position. Referring to Fig. 1, I have found it particularly easy to associate the two left-hand and the lower right-hand bracing portions 17 initially, and then to force the upper right-hand bracing portion 17 outwardly until it snaps over the outer surface of the rim 11. Regardless of the procedural steps effecting the attachment, the device will always assume the position shown in Fig. 1. It will be noted that sidewise slipping or movement will be absolutely prevented because of the secure bracing action afforded by both the upwardly and the downwardly diverging clamping arms. Slippage or movement in a vertical direction is also impossible because of this peculiar bracing arrangement.

Figure 3:
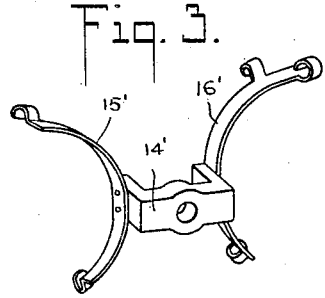
Fig. 3 is a view similar to Fig. 2 showing a modification.

In Fig. 3 I have illustrated a modified form wherein the device is constructed nonintegrally, the medial body portion 14' being in this case constituted of an integral casting or molded block, and the arms 15' and 16' being attached to the opposite ends thereof. The form of Fig. 3 is particularly advantageous where the body portion 14' is made of insulating material, a construction of this character facilitating, in certain cases, the suitable attachment and mounting of an instrument such as the head lamp 13.

It will be readily understood that spectacle frames may vary, particularly in connection with the height of the bridge. Although my device will always assume the same position with respect to a particular frame, it renders itself readily to slight initial adjustment so that its future positioning will always be in accordance with requirements or desires. In other words, if the device illustrated in Fig. 2 is to be associated with a spectacle frame wherein the bridge 12 is slightly higher than the bridge shown in Fig. 1, a mere pinching together of the lower ends of the clamping arms, and a slight spreading of the upper ends thereof, will cause the device to position itself slightly higher, with respect to the circular rim portions; and similar initial adjustments of the clamping arms will render the device usable with any type of ordinary spectacle frame.

It will be obvious that many changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. As a removable attachment for a spectacle frame, a supporting device for a head lamp or the like, said device comprising a medial body portion adapted to overlie the bridge of the frame and to support said lamp, and two pairs of clamping arms carried by said body portion and extending upwardly and downwardly respectively, said pairs being arranged and constructed to brace themselves respectively between the upwardly and the downwardly diverging frame portions adjacent to the bridge.

2. As a removable attachment for a spectacle frame, a supporting device for a head lamp or the like, said device comprising a medial body portion adapted to overlie the bridge of the frame and to support said lamp, and two pairs of resilient clamping arms extending upwardly and downwardly respectively from the ends of the body portion, said arms being arranged and constructed to engage the rim portions above and below the bridge respectively.

3. As a removable attachment for a receptacle frame, a supporting device for a head lamp or the like, said device comprising a medial body portion adapted to overlie the bridge of the frame and to support said lamp, and two pairs of spring clamps carried by the body portion, said pairs diverging upwardly and downwardly respectively from the opposite ends of the body portion and adapted to brace the latter between the opposite upwardly and downwardly extending frame portions adjacent to the bridge respectively, the adjacent upward and downward clamps comprising integral strips of resilient material attached medially to respective ends of the body portion.

4. As a removable attachment for a spectacle frame, a supporting device for a head lamp or the like, said device comprising a medial body portion adapted to overlie the bridge of the frame and to support said lamp, and two pairs of spring clamps carried by the body portion, said pairs diverging upwardly and downwardly respectively from the opposite ends of the body portion and adapted to brace the latter between the opposite upwardly and downwardly extending frame portions adjacent to the bridge respectively, the adjacent upward and downward clamps comprising integral strips of resilient material conforming substantially to the frame portions adjacent the bridge.

5. As a removable attachment for a spectacle frame, a supporting device for a head lamp or the like, said device comprising a medial body portion adapted to overlie the bridge of the frame and to support said lamp, and two pairs of spring clamps carried by the body portion, said pairs diverging upwardly and downwardly respectively from the opposite ends of the body portion and adapted to brace the latter between the opposite upwardly and downwardly extending frame portions adjacent to the bridge respectively, the adjacent upward and downward clamps comprising resilient arcuate strips attached medially to respective ends of the body portion and provided with bracing portions adjacent to their opposite ends.

6. As a removable attachment for a spectacle frame, a supporting device for a head lamp or the like, said device comprising a medial body portion adapted to overlie the bridge of the frame and to support said lamp, and two pairs of spring clamps carried by the body portion, said pairs diverging upwardly and downwardly respectively from the opposite ends of the body portion and adapted to brace the latter between the opposite upwardly and downwardly extending frame portions adjacent to the bridge respectively, the adjacent upward and downward clamps comprising resilient arcuate strips having bracing portions adjacent to their ends, the adjacent strips together spanning arcs of approximately 90°, whereby the points of bracing are substantially spaced and the rigidity of the bracing is accordingly enhanced.

7. As a removable attachment for a spectacle frame, a supporting device for a head lamp or the like, said device comprising a medial body portion adapted to overlie the bridge of the frame and to support said lamp, and two pairs of spring clamps carried by the body portion, said pairs diverging upwardly and downwardly respectively from the opposite ends of the body portion and adapted to brace the latter between the opposite upwardly and downwardly extending frame portions adjacent to the bridge respectively, the adjacent upward and downward clamps comprising resilient arcuate strips which conform substantially to the frame portions adjacent to the bridge, and which have normal curvatures slightly less than said frame portions.

8. As a removable supporting element of the character described, an integral blank of resilient material shaped into a substantial H, said blank being bent at the extremities of the cross bar of the H, so as to position the uprights in substantially parallel juxtaposed planes, and said uprights being shaped into juxtaposed arcs diverging from the cross bar of the H.

9. As a removable attachment for a spectacle frame, a supporting device for a head lamp or the like, said device comprising a medial body portion adapted to overlie the bridge of the frame and to support said lamp, and clamping arms carried by said body portion and constructed and arranged to engage certain frame portions adjacent to the bridge.

In witness whereof, I have signed this specification this 4th day of January, 1927.

ROBERT YOUNG.